United States Patent
Hellebergh

(10) Patent No.: US 6,220,140 B1
(45) Date of Patent: Apr. 24, 2001

(54) TOOTH ARRANGEMENT OF METAL-CUTTING BANDSAW BLADE

(75) Inventor: Håkan Hellebergh, Lidköping (SE)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 09/317,631

(22) Filed: May 25, 1999

(30) Foreign Application Priority Data

May 26, 1998 (SE) .................................... 9801839

(51) Int. Cl.⁷ .................................... B27B 33/02
(52) U.S. Cl. .................................... 83/851; 83/835
(58) Field of Search .................. 83/848, 851, 850, 83/661, 835

(56) References Cited

U.S. PATENT DOCUMENTS

| | | | |
|---|---|---|---|
| 4,179,967 | * 12/1979 | Clark | 83/661 |
| 4,557,172 | * 12/1985 | Yoneda | 83/848 |
| 4,727,788 | * 3/1988 | Yoshida et al. | 83/848 |
| 5,331,876 | 7/1994 | Hayden, Sr. . | |
| 5,603,252 | 2/1997 | Hayden, Sr. . | |

FOREIGN PATENT DOCUMENTS

| | | |
|---|---|---|
| 43 24 411 | 2/1994 | (DE) . |
| 523 586 | 8/1921 | (FR) . |
| 1 406 673 | 11/1965 | (FR) . |
| 4-069112 | 3/1992 | (JP) . |

OTHER PUBLICATIONS

Article: "DoAll Multi–Pitch Band Saw Blades", Machinery and Production Engineering, Burgess Hill, GB (Oct. 19, 1977, pp. 384–385).

* cited by examiner

*Primary Examiner*—M. Rachuba
(74) *Attorney, Agent, or Firm*—Burns, Doane, Swecker & Mathis, L.L.P.

(57) ABSTRACT

Bandsaw blade for sawing metal, including straight teeth and set teeth, the set teeth having equal height and occurring in pairs. A distance between the set teeth of each pair of set teeth being equal to the distance between the set teeth of every other pair of set teeth. The distance from each set tooth to an adjacent straight tooth being larger than the distance between the set teeth.

4 Claims, 1 Drawing Sheet

TOOTH ARRANGEMENT OF METAL-CUTTING BANDSAW BLADE

BACKGROUND OF THE INVENTION

The present invention relates to metal-cutting bandsaw blades and, in particular, to a tooth arrangement for such blades, wherein there are both straight teeth and set teeth.

Bandsaw blades for cutting metal have long been made with differences in tooth height, tooth pitch distance and teeth setting, which has proven to be an efficient way to avoid vibrations and to get smoother cut surfaces especially when cutting large diameter solid sections. One known way to make such a saw blade is to arrange the teeth in recurring groups with variable pitch distances between the teeth of each group. The length of each group should preferably be at least as great as the thickness of the material to be cut. It has also been shown that to achieve best results it is important to have very good repeatability (consistency) of the tooth setting, i.e., not only the amount and angle of tooth setting, but also the angle of twist the tooth during setting. One known way to do this is to use tools large enough for punching, grinding and simultaneously setting all the set teeth of the group, but in the case of long groups that approach requires expensive tooling. Setting the teeth individually is difficult to do with precision, since the twist and the spring-back occurring after setting are much influenced by the magnitude of the distance to the adjoining teeth, as well as the nature of the setting of the adjoining teeth, which may vary within the recurring group.

The present invention concerns a bandsaw blade with teeth arranged for easy precision setting by means of tooling of limited size, even for saw blades with large teeth and long average pitch distance.

SUMMARY OF THE INVENTION

The invention relates to a metal-cutting bandsaw blade comprising both straight teeth and set teeth. The set teeth have equal height and occur in pairs, with the distances between the set teeth in respective pairs of set teeth being equal. A distance from any set tooth to an adjacent straight tooth has a value which is different and larger than the distance between the set teeth.

BRIEF DESCRIPTION OF THE DRAWING

A bandsaw blade, according to the invention is described with reference to the appended figures wherein.

DETAILED DESCRIPTION OF A PREFERRED EMBODIMENT OF THE INVENTION

A metal-cutting saw blade according to the invention includes set teeth and straight teeth. As explained in greater detail below, all of the set teeth are arranged in pairs, one set tooth of each pair being set to the right and the other set to the left, with a relatively short distance provided between the teeth of the pair. That distance is equal to the distance between the set teeth of every other pair of set teeth of the blade. The straight teeth are arranged between successive pairs of set teeth and are separated from those pairs by distances which are longer than the distance separating the set teeth of each pair, in order to reduce the influence on the setting operation. To produce the effect of a long recurring group, the distance between adjacent straight teeth or the distance from the straight teeth to an adjacent pair of set teeth may be varied, e.g., randomly or according to a predetermined rule.

Figure 1:
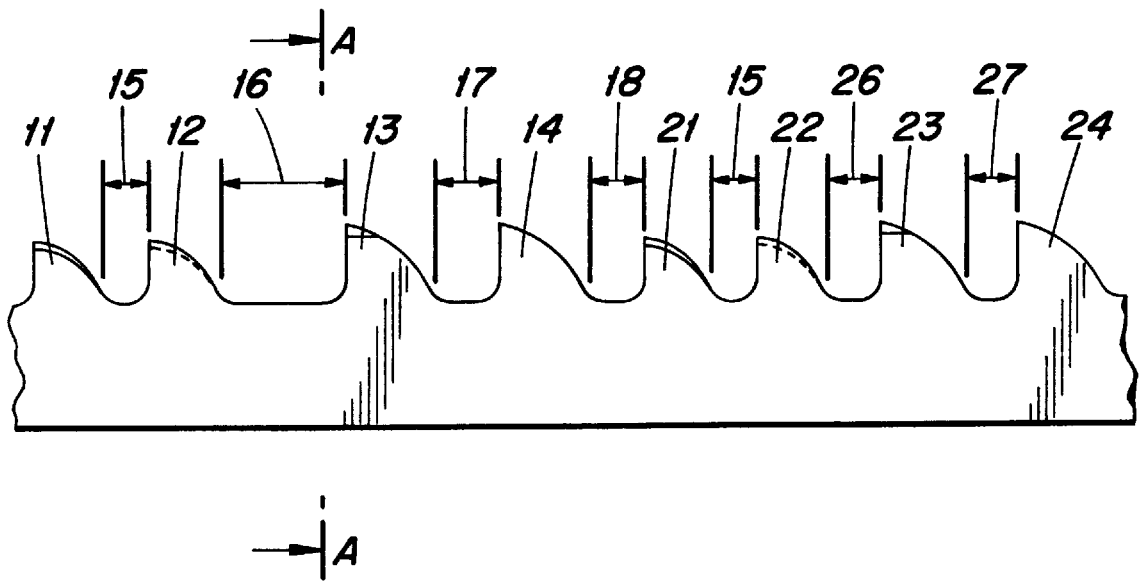
FIG. 1 is a side view of part of a saw blade according to the invention.
Figure 2:
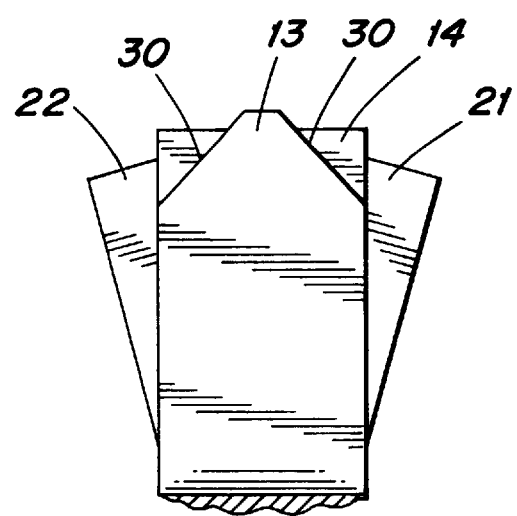
FIG. 2 is a sectional view taken along the line A—A in FIG. 1.

Shown in FIG. 1 are four of the set teeth (11, 12, 21, 22), half of them (11,21) set to the right and half of them (12,22) set to the left. The set teeth occur in pairs, each pair including a tooth set to the right and a tooth set to the left, and the distance (15) between the teeth of each pair of set teeth equal to the distance (15) between the set teeth of every other pair of set teeth. This allows simultaneous setting of both set teeth of one pair with one set of hammers and anvils after aligning the tools by indexing on the first tooth (e.g., 11) of the pair. The setting tools will thus also be aligned with the second tooth (12) of the pair since the spacing distance (15) is constant and equal from one pair to the next.

Preferably, the setting direction order (i.e., left-right or right-left) of the teeth of each pair should be the same, since that allows a more even distribution of cutting depth for the set teeth. That is, the leading tooth (11, 21) of each pair could be set to the right, and the trailing tooth (12, 22) of each pair would thus be set to the left.

Between adjacent pairs of set teeth there are provided one, two or three straight (unset) teeth, with two straight teeth (13, 14 or 23, 24) being depicted. The straight teeth should be higher than the set teeth to ensure a smooth cut even at the beginning of a cutting operation, since the first chips of each cut are produced without any lateral forces. Preferably, there should be a leading high straight tooth (13, 23) with large chamfers 30 at outer edges of its cutting edge, followed by a slightly lower (shorter) straight tooth (14, 24) with smaller chamfers or no chamfers.

Each of the set teeth is spaced from a straight tooth by a distance (e.g., distances (16, 18, 26) in FIG. 1). Each of those distances (16, 18, 26) is greater than the distance (15) separating the two teeth of each pair of set teeth. Since, as observed earlier, the influence of adjacent straight teeth upon the setting of the set teeth decreases sharply with an increased spacing distance from the set teeth to the straight teeth, the depicted arrangement will promote a precision setting of the set teeth. The distance (17, 27) between adjacent straight teeth does not influence the setting precision, but should be made large to provide enough gullet area for the chips. To achieve the best vibration reduction corresponding to long recurring tooth groups, the distances (16, 18, 26) separating each pair of set teeth from the straight teeth should be varied, which can be done by making the punching or grinding tools produce flat-bottomed gullets which may overlap to some extent, which overlap may be varied according to a predetermined scheme, or randomly.

The chamfers on leading straight teeth are ground with indexing on those teeth, and that operation is not influenced or disturbed by distances to other teeth.

It will be appreciated that the present invention enables a precision setting of the set teeth to be made by relatively inexpensive tooling since it is possible to use tooling which sets only two teeth at a time.

The teeth of the sawblade need not be provided as identical recurring groups. In fact, it is possible for none of the distances between a straight tooth and a set tooth to be equal in the entire blade, as long as the distances between successive set teeth are equal and smaller than the distance between each set tooth and a nearest straight tooth.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A metal-cutting bandsaw blade, comprising straight teeth and set teeth, the set teeth having equal height and occurring in pairs, with a distance between the set teeth in each pair being equal to a distance between the set teeth of every other pair of set teeth, a distance from each set tooth to an adjacent straight tooth being larger than the distance between the set teeth of each pair of set teeth.

2. Bandsaw blade according to claim 1, wherein there is from one to three straight teeth between successive pairs of set teeth.

3. Bandsaw blade according to claim 2, wherein there is a plurality of straight teeth between successive pairs of set teeth, a leading one of the straight teeth of each plurality of straight teeth being higher than the set teeth.

4. Bandsaw blade according to claim 3, wherein at least the leading tooth of each plurality of straight teeth has chamfers at both ends of a cutting edge thereof.

* * * * *